United States Patent
Sakurai et al.

(10) Patent No.: US 10,310,840 B2
(45) Date of Patent: Jun. 4, 2019

(54) COMPUTER SYSTEM, METHOD OF MANAGING TRANSMISSION OF SOFTWARE WITH COMPUTER SYSTEM, PROGRAM THEREFOR, AND RECORDING MEDIUM

(71) Applicant: Hitachi, Ltd., Chiyoda-ku, Tokyo (JP)

(72) Inventors: Soki Sakurai, Tokyo (JP); Atsushi Katou, Tokyo (JP); Noboru Kiyama, Tokyo (JP); Hiroshi Mine, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 15/666,997

(22) Filed: Aug. 2, 2017

(65) Prior Publication Data

US 2018/0095744 A1    Apr. 5, 2018

(30) Foreign Application Priority Data

Sep. 30, 2016    (JP) .................................. 2016-194790

(51) Int. Cl.
| | |
|---|---|
| *G06F 9/445* | (2018.01) |
| *G06F 8/65* | (2018.01) |
| *G06F 11/07* | (2006.01) |
| *G06F 11/34* | (2006.01) |
| *G06F 11/14* | (2006.01) |

(52) U.S. Cl.
CPC .............. *G06F 8/65* (2013.01); *G06F 11/076* (2013.01); *G06F 11/0709* (2013.01); *G06F 11/0739* (2013.01); *G06F 11/0742* (2013.01); *G06F 11/0793* (2013.01); *G06F 11/1433* (2013.01); *G06F 11/3409* (2013.01); *G06F 11/3495* (2013.01)

(58) Field of Classification Search
USPC ........................................................ 717/172
See application file for complete search history.

(56) References Cited

U.S. PATENT DOCUMENTS

| | | | |
|---|---|---|---|
| 9,311,066 B1 | 4/2016 | Garman et al. | |
| 2002/0072893 A1* | 6/2002 | Wilson | ................ G06F 13/1605 |
| | | | 703/26 |

(Continued)

FOREIGN PATENT DOCUMENTS

| | | |
|---|---|---|
| JP | 2008-176722 A | 7/2008 |
| WO | WO 2004/044702 A2 | 5/2004 |
| WO | WO 2008/002856 A2 | 1/2008 |

OTHER PUBLICATIONS

Extended European Search Report issued in counterpart European Patent Application No. 17183668.7 dated Feb. 15, 2018 (Seven (7) pages).

*Primary Examiner* — Chameli Das
(74) *Attorney, Agent, or Firm* — Crowell & Moring LLP

(57) ABSTRACT

Provided is a computer system capable of managing the performance of processing upon transmitting software to terminals. The present invention is a computer system comprising a plurality of modules which sequentially execute processing up to transmitting the software to the terminal, a controller which collects an operation log of each of the plurality of modules, and a memory which stores the operation logs collected by the controller, wherein the controller generates an operating performance of a prescribed module among the plurality of modules based on the operation logs stored in the memory.

10 Claims, 14 Drawing Sheets

(56) References Cited

U.S. PATENT DOCUMENTS

| | | | |
|---|---|---|---|
| 2004/0015762 A1* | 1/2004 | Klotz | G06F 11/2294 |
| | | | 714/742 |
| 2005/0021708 A1* | 1/2005 | Raghuraman | G06Q 10/10 |
| | | | 709/223 |
| 2005/0240665 A1* | 10/2005 | Gu | H04L 12/2805 |
| | | | 709/220 |
| 2008/0021839 A1* | 1/2008 | Peinado | G06F 21/10 |
| | | | 705/59 |
| 2008/0177827 A1 | 7/2008 | Takaike et al. | |
| 2009/0070756 A1* | 3/2009 | Wei | G06F 8/65 |
| | | | 717/172 |
| 2010/0332634 A1* | 12/2010 | Keys | G06F 8/65 |
| | | | 709/223 |
| 2013/0226877 A1* | 8/2013 | Nagai | G06F 11/0793 |
| | | | 707/687 |
| 2015/0309809 A1* | 10/2015 | Shin | G06F 9/48 |
| | | | 718/100 |
| 2016/0020802 A1* | 1/2016 | Lee | H04B 1/3816 |
| | | | 455/558 |
| 2017/0048661 A1* | 2/2017 | Park | H04W 4/02 |

\* cited by examiner

FIG. 3

| MODULE NAME | TIME | INPUT DATA | OUTPUT DATA | PROCESSING RESULT | FLOW ID |
|---|---|---|---|---|---|
| Mod-0 | 2016/5/25 12:00:00 | /data/data1 | /data/data2 | NORMAL | Flow-01 |
| 300 | 301 | 302 | 303 | 304 | 305 |

Flow-01-A-A

| FLOW ID | | | | | | |
|---|---|---|---|---|---|---|
| | MODULE NAME (502) | TIME (503) | INPUT DATA (504) | OUTPUT DATA (505) | PROCESSING RESULT (506) | FLOW ID (507) |
| EXECUTION RECORD LIST | Mod-0 | 2016/5/25 12:00:00 | /data/data1 | /data/data2 | NORMAL | Flow-01 |
| | Mod-1A | 2016/5/25 12:01:01 | /data/data2 | /data/data3 | NORMAL | Flow-01 |
| | Mod-2B | 2016/5/25 12:02:02 | /data/data3 | /data/data4 | NORMAL | Flow-01 |
| | Mod-3 | 2016/5/25 12:03:09 | /data/data4 | /data/data5 | NORMAL | Flow-01 |
| | Mod-4A | 2016/5/25 12:04:03 | /data/data5 | /data/data6 | NORMAL | Flow-01-A |
| UPDATE RECORD | TERMINAL NAME | TIME | DIFFERENCE SOFTWARE | | PROCESSING RESULT | FLOW ID |
| | CL-A | 2016/5/25 12:10:00 | /data/data6 | | ERROR 001 | Flow-01-A-A |

COMPUTER SYSTEM, METHOD OF MANAGING TRANSMISSION OF SOFTWARE WITH COMPUTER SYSTEM, PROGRAM THEREFOR, AND RECORDING MEDIUM

TECHNICAL FIELD

The present invention relates to a computer system which transmits updating software to terminals.

BACKGROUND ART

In recent years, pursuant to the wide use of control systems in many products, the importance of functional safety is being debated. Accordingly, the functional safety of an OTA (Over The Air) center as a system which remotely updates software must also be contemplated. An OTA center is a system which enables the remote update of control software of terminals such as smartphones and automobiles as products to be controlled.

The functional safety standard was formulated at the end of the 1990's mainly by European countries, and, based on "IEC 61508" as the international standard, today independent functional safety standards are being formulated for each product category.

As this type of functional safety standard, there is "ISO 26262". This functional safety standard applies to hardware/software of electric/electronic equipment related to sensors, control units (ECU), and actuators (motor) among the various systems equipped in automobiles.

"ISO 26262" defines the functional safety across a broad domain (entire lifecycle) from the requirement definition (conceptual phase) to the development, provision, maintenance/operation and vehicle disposal, and automobile manufacturers, automobile parts manufacturers and other suppliers are required to observe this functional safety standard.

In order to inspect the functional safety standard, the business operator of an OTA center may use the operating performance of the software distributed to the terminals. As a system which enables the foregoing inspection, there is, for example, the software operating performance management system disclosed in PTL 1. With this system, the server distributes monitoring software to the terminals, and the server receives the operating performance of the software in the terminal from the monitoring software.

PTL2 discloses a file upgrade system comprising a host system and client devices such as portable communication devices. The client devices receive upgrade files via at least one wireless coupling. The contents of the upgrade file include information to repair errors in software components of the portable client device and/or information to upgrade functions of the portable client device. The client device automatically upgrades the software components using the upgrade file contents. The client device automatically recovers to an operational state when detecting an error or failure during the automatic upgrade.

CITATION LIST

Patent Literature

[PTL1] Japanese Patent Application Publication No. 2008-176722
[PTL2] International Patent Application No. WO2004/044702 A2.

SUMMARY OF THE INVENTION

Problems to be Solved by the Invention

With the "ISO 26262", it is possible to certify that the software and/or hardware component module is compliant with the defined safety requirements based on the "Proven in Use" Section. In other words, if the OTA center has a proven track record of being able to normally distribute system updating software to terminals, then the examining authority of functional safety can divert such track record to the evaluation or screening of the functional safety requirements. Nevertheless, PTL 1 gives no consideration to causing the server to manage the foregoing performance. Thus, an object of the present invention is to provide a computer system capable of managing the performance of processing upon transmitting software to terminals.

Means to Solve the Problems

In order to achieve the foregoing object, the present invention provides a computer system which transmits software for updating a terminal, comprising: a plurality of modules which sequentially execute processing up to transmitting the software to the terminal; a controller which collects an operation log of each of the plurality of modules; and a memory which stores the operation logs collected by the controller, wherein the controller generates an operating performance of a prescribed module among the plurality of modules based on the operation logs stored in the memory.

Advantageous Effects Of The Invention

According to the present invention, it is possible to provide a computer system capable of managing the performance of processing upon transmitting software to terminals.

BRIEF DESCRIPTION OF DRAWINGS

FIG. 3 is a table (example of an execution record) that is sent from a module of the computer system to a performance management module.
FIG. 5 shows an example of performance data stored by the performance management module in a performance DB.

DESCRIPTION OF EMBODIMENTS

Figure 1:
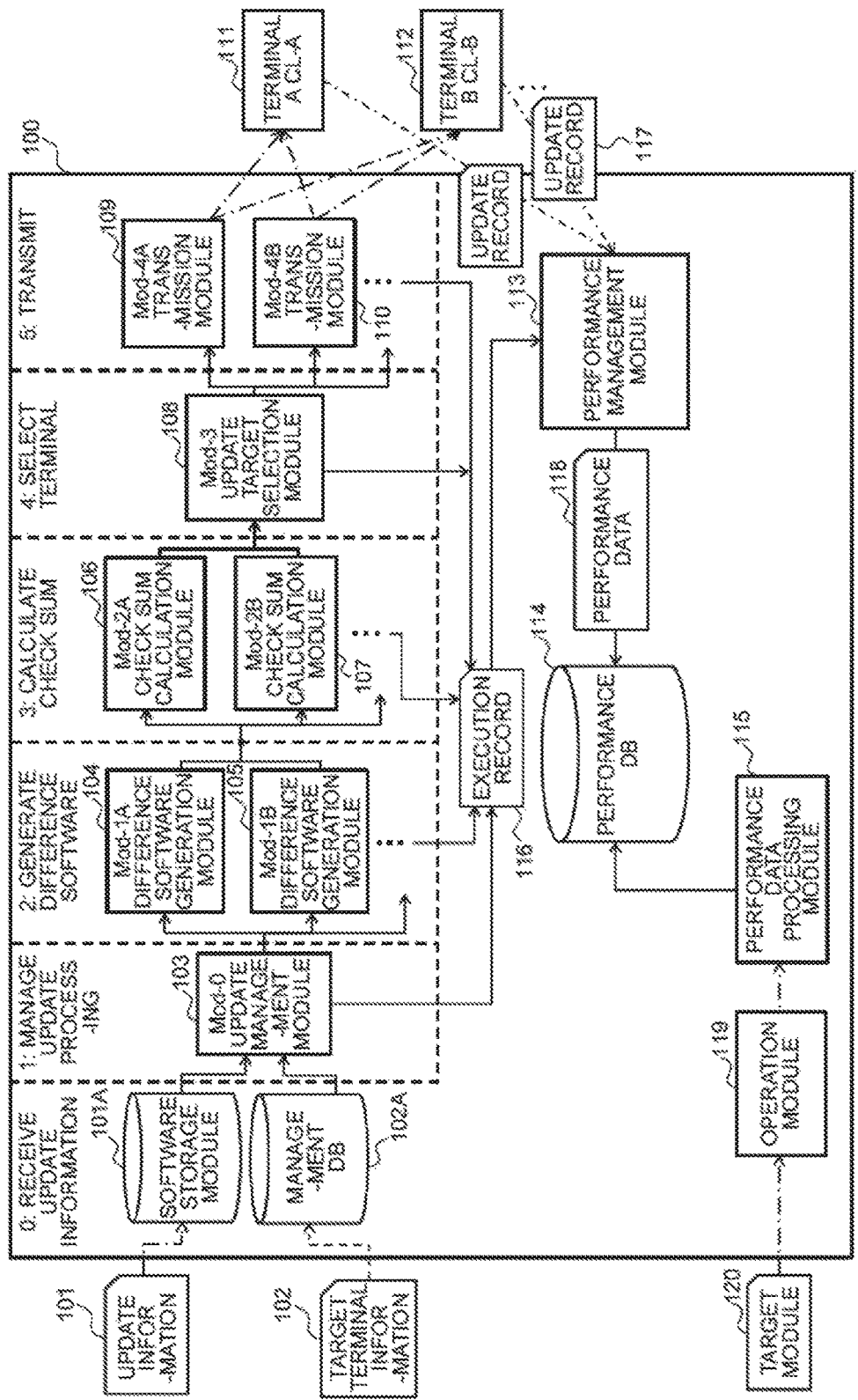
FIG. 1 is a functional block diagram of a computer system configuring an OTA center.

One mode of the computer system according to the present invention is an OTA center as described above. Since software which controls the operation and functions of terminals is updated to a new version as needed, the OTA center assumes a major part of the processing for updating the software of terminals such as by managing the software for updating the terminals and transmitting the software to the terminals.

As the terminals in which the software is updated by an OTA center, there are, for example, engine control units (ECU) of automobiles, but the terminals are not limited thereto, and the terminals may also be, for instance, smartphones, intelligent home appliances, and gas appliances. To the extent that the terminals must be compliant with the functional safety standard, the same applies to the OTA center.

The OTA center comprises a plurality of modules which sequentially execute the processing up to transmitting the software to the terminals. Furthermore, as described later, for instance, since there are a plurality of types of algorithms to generate difference software (updating software) for updating the terminals, even if the modules are the same, there are a plurality of types of those modules. In addition, since there are also a plurality of types of additional processing to be performed to the updating software, such as the calculation of a check sum, the computer system additionally comprises a plurality of modules.

A module is a unit for exhibiting the function of the computer system. As the modules, there are hardware modules and software modules (functional modules). When the term "module" is used in the ensuing explanation, reference is made to the latter module. A module is realized by a controller which executes a program. A module is all or a part of a program.

The computer system can generate, as evidence for the functional safety inspection, an operating performance (or running performance) of a module for the "Proven in Use" described above. The term "operating performance" is an index regarding whether the module operated normally, and, for instance, there is a failure rate (FIT: Failure In Time). Furthermore, in order to be able to use the operating performance as evidence in the inspection of the functional safety standard, it is desirable that the operating performance is sufficient for determining the cause in cases where a computer system was unable to transmit the updating software to the terminal; for instance, sufficient for determining in which module among the plurality of modules an error occurred, and whether the flow of processing up to the transmission of software was halted or discontinued. The computer system of the present invention is able to provide the foregoing operating performance.

When the computer system was unable to correctly transmit the software to a terminal, the computer system can identify whether the unsuccessful transmission was caused by the terminal or the computer system and, in the case of the latter, which module was responsible. Furthermore, when the cause of the unsuccessful transmission was a combination of a plurality of modules, the computer system can identify such combination of plurality of modules. The flow of processing within the computer system up to transmitting the software is divided into a plurality of paths in accordance with through which module among a plurality of modules the processing has passed. The computer system is also able to clarify the path in which the error occurred. The computer system is now described in detail in the ensuing explanation.

FIG. 1 is a functional block diagram of a computer system 100 configuring an OTA center. As described below, the computer system 100 comprises a plurality of modules. Reference numeral 101 represents update information (software or the like) to be applied to the terminated to be updated (hereinafter referred to as the "update-target terminal"), and reference numeral 102 represents campaign information for identifying the update-target terminal. When the update-target terminal is an engine control unit (ECU) of an automobile, the campaign information includes the automobile manufacturer name and the vehicle model. The update information and the campaign information are transmitted from the system of the automobile manufacturer to the computer system 100.

The software to be applied to the update-target terminal is, for example, all or a part of the new version software to be applied to the terminal. Note that the software to be applied to the update-target terminal may also be the difference between the old version and the new version. In the foregoing case, the difference software generation processing described later may be omitted.

The computer system 100 transmits the updating software to the terminal by sequentially performing the following steps: reception of update information (0), management of update processing (1), generation of difference software (2), calculation of check sum (3), selection of update-target terminal (4), and transmission of difference software (5). Each step is executed by the following modules.

The modules are now explained in detail. In the step of reception of update information (0), a software storage module 101A stores, in a prescribed storage area, a new version of the software received from the system of the automobile manufacturer, and the campaign information is recorded in a management database (management DB) 102A. The management DB 102A is registered with attribute information of the terminal such as the destination address and ID of each of a plurality of terminals.

In the step of management of update processing (1), an update management module (Mod-0) 103 receives, from the software storage module 101A, information of the access path of the storage area where the new version of the software is being stored, and decides, determines, sets or selects which module among difference software generation modules (Mod-1A, Mod-1B, . . . ) 104, 105, . . . is to be used, and which module among check sum calculation modules (Mod-2A, Mod-2B, . . . ) 106, 107 . . . is to be used.

Since there are a plurality of patterns in the combination of difference software generation modules and check sum calculation modules, branches are generated in the flow of processing up to transmitting the updating software to the terminal. The update management module (Mod-0) 103 may decide which difference generation module and which check sum calculation module will be used based on the contents of the software (new version).

The update management module (Mod-0) 103 additionally refers to the management database 102A based on the campaign information, and decides the terminal to which the updating software is to be transmitted. The update management module (Mod-0) 103 outputs the decision information of the module and the decision information of the terminal, and the access information of the storage area of the software of both the new version and the old version, to the step of generation of difference software (2).

In the step of generation of difference software (2), the difference software generation modules (Mod-1A, Mod-1B, . . . ) 104, 105, . . . can each compare the new version and the old version of the software and generate difference software corresponding to the difference between the new version and the old version. The difference software is the software (updating software) for updating the terminal.

The algorithm for generating the difference software differs for each of the plurality of difference software generation modules. The module decided by the update management module (Mod-0) 103 generates the difference software. The difference software generation module records the difference software in a prescribed storage area. The module that generated the difference software outputs, to the step of calculation of check sum (3), access information to the recording area of the difference software and information of the terminal to which it has been decided that the difference software is to be transmitted.

In the step of calculation of check sum (3), the check sum calculation modules (Mod-2A, Mod-2B, . . . ) 106, 107, . . . each calculate the check sum of the difference software. The algorithm for calculating the check sum differs for each of the plurality of check sum calculation modules. The module decided by the update management module (Mod-0) 103 calculates the check sum. This module outputs, to the step of selection of update-target terminal (4), access information to the recording area of the difference software, the check sum and the decision information of the terminal.

In the step of selection of update-target terminal (4), the update-target selection module (Mod-3) 108 selects the terminal (update-target terminal) to which the difference software is to be transmitted from the decision information of the terminal, and outputs, to the step of transmission of difference software (5), the selected information, the access information to the difference software, and the check sum. The update-target selection module (Mod-3) 108 transmits the difference software from an optimal transmission module among a plurality of transmission modules to the terminal according to the characteristics of the terminal.

In the step of transmission of difference software (5), there are a plurality of transmission modules. The transmission modules (Mod-4A, Mod-4B, . . . ) 109, 110 . . . each have different distribution paths and communication standards. Each of the plurality of transmission modules reads the difference software from the storage area and transmits the difference software to the selected terminal. Reference numerals 111 and 112 are each a terminal. The terminals receive the difference software from the computer system 100, install the difference software in their own system, and then update the software. The flow up to transmitting the difference software is branched into a plurality of patterns depending on which of the modules among the plurality of modules the difference software passed through, and from which transmission module the difference software was sent to the terminal.

Reference numeral 113 represents the performance management module. The performance management module 113 executes various types of processing for managing the performance of processing for updating the software in the computer system 100 and in each of the plurality of terminals 111, 112 . . . . The performance management module 113 collects, from each of the foregoing modules, the execution record (operation log) 116 of the processing pertaining to the generation and transmission of difference software, collects the update result (update record) 117 from the terminals, extracts, decides and creates the performance data 118 of the processing from the collected data, and records the result in the performance database (performance DB) 114. Each of the modules from the update management module 103 to the transmission modules (109, 110, . . . ) sends to the performance management module 113, each time the processing is complete, the execution record 116 of the processing in the module. The performance management module 113 may also poll each of the plurality of terminals and confirm the completion of processing, and acquire the update record 117 from the terminals.

Reference numeral 115 represents a performance data processing module. The performance data processing module 115 calculates the FIT of the module based on the performance data 118 stored in the performance DB 114 for indicating the operating performance of the module, and identifies the module in which an error occurred in the processing of the difference software or the combination of a plurality of modules which caused the error. Instructions to the performance data processing module 115 are given by the administrator from the operation module 119. The instructions include the designation of the module or the combination of a plurality of modules to be subject to the performance data processing module 115.

Figure 2:
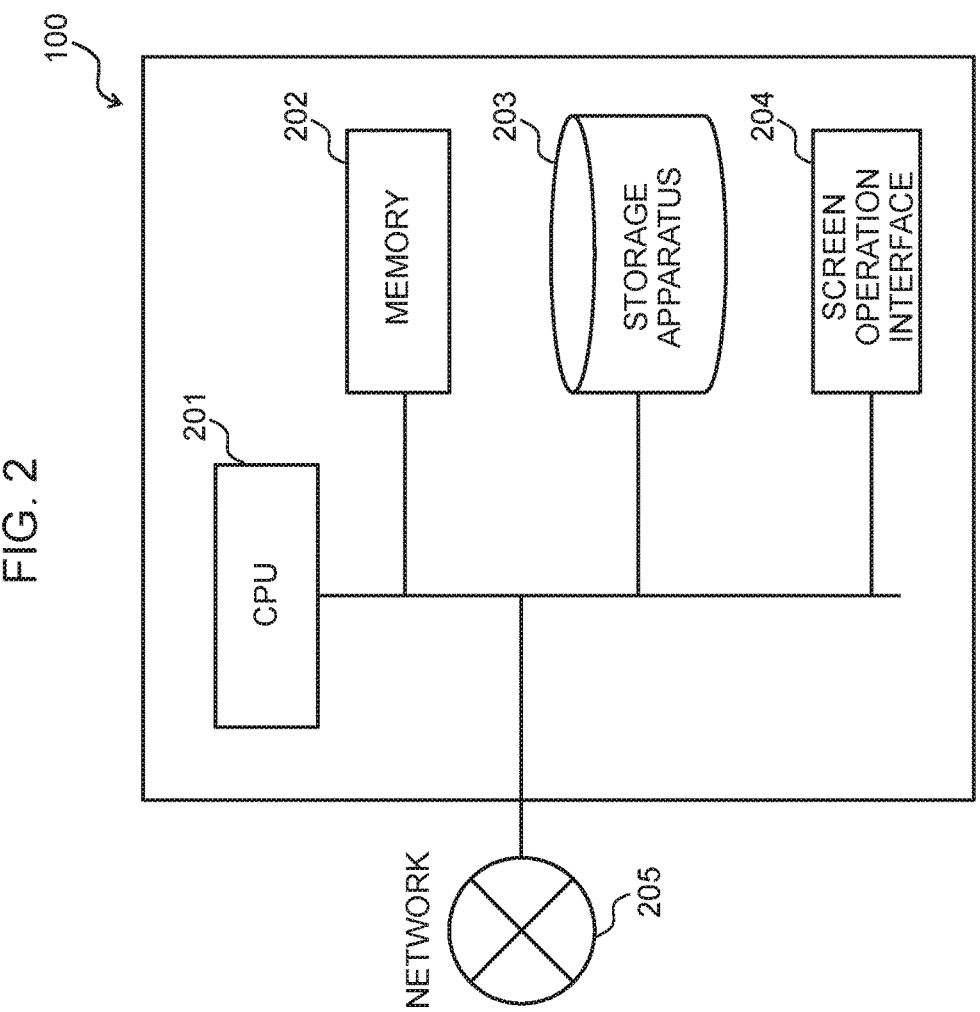
FIG. 2 shows an example of a hardware configuration of a processing unit configuring the computer system.

FIG. 2 shows an example of the hardware configuration of the processing unit configuring the computer system 100. The computer system 100 comprises a CPU 201, a memory 202, a storage apparatus 203, and a screen operation interface 204, and is connected to an external system via a network 205. The computer system may also be configured by combining a plurality of processing units 200.

The foregoing module is realized as a CPU (controller) 201 which executes one or more programs. The performance data DB 114 may exist in the storage apparatus 203, or exist in an external storage apparatus that can be accessed by the computer system 100 via the network 205. The screen operation interface 204 realizes the operation module 119.

FIG. 3 is a table (example of the execution record 116 (operation log)) that is sent from a module of the computer system 100 to the performance management module 113. The execution record 116 may also be an execution log of the module; that is, the history of processing in the module. The execution record 116 includes a module name 300, time 301 that the module was processed, input data 302 input to the module, output data 303 output to the module, a processing result 304, and a flow ID 305. The reference numerals that are indicated as the input data and the output data may be the access path to the storage area of data, or the data itself. The processing status of the module can be identified based on the items illustrated in FIG. 3.

The execution record of FIG. 3 is of the update management module (Mod-0) 103. As described above, in the computer system 100, since there are branches in the flow of data passing through the module, the update management module 103 assigns a flow ID to each of the plurality of flows. The module which outputs the execution record determines whether the processing ended normally or unsuccessfully, and records "normal" in the processing result 304, or records "error code" in the case of the latter.

The processing being unsuccessful means that the module does not output data; that is, the data flow has stopped at that module. The term "unsuccessful" may also include cases where the module has output inappropriate data. The term "normal" means that the module has output valid data and the data flow is continuing.

According to FIG. 3, the update management module 103 ended the processing normally at 2016/5/25 12:00:00. The input data to the module 103 is /data/data1, and the output data is /data/data2. The flow ID 305 uniquely indicates the processing up to the distribution of the difference software to the terminal.

The module receives the input data and the flow ID from the upstream module, and delivers the output data and the flow ID to the downstream module. Furthermore, since the computer system 100 distributes the same difference software to a plurality of terminals via different paths, the data flow is additionally branched from the update-target selection module 108 onward. For example, when the transmission module 109 distributes data having a flow ID of "Flow-01" from the update-target selection module 108 to the terminal, the transmission module 109 independently branches the flow ID, and sends the execution record 116, as the flow ID of "Flow-01-A", to the performance management module 113.

Figure 4:
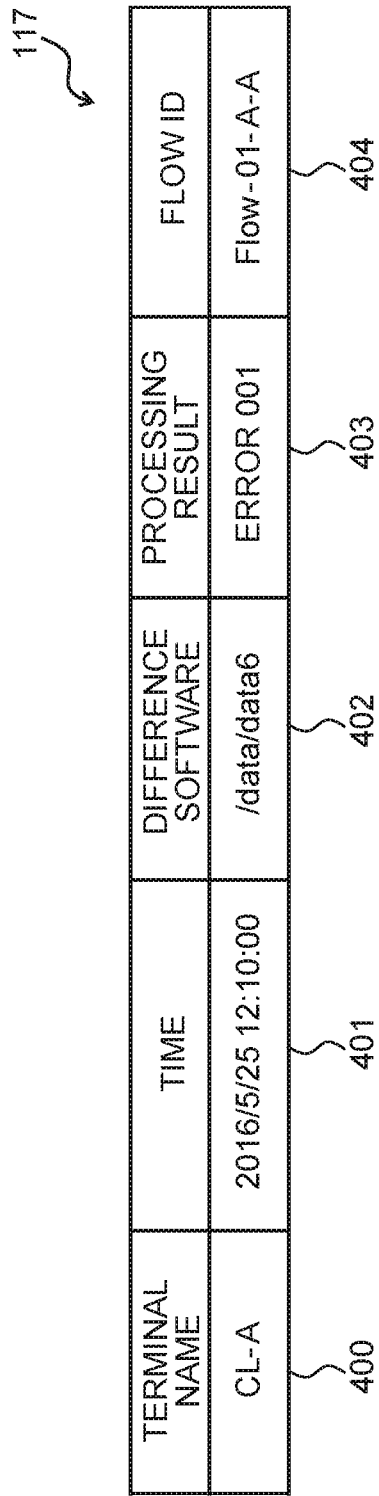
FIG. 4 shows an example of an update record acquired by the performance management module from a terminal.

FIG. 4 shows an example of the update record 117 acquired by the performance management module 113 from the terminal. The update record 117 is configured from a terminal name 400, time 401 that the update was executed, difference software 402, a processing result 403, and a flow ID 117. When the update in the terminal ended normally, "normal" is recorded in the processing result 403, but an error code is recorded when the update is unsuccessful.

The example shown in FIG. 4 illustrates that a terminal CL-A (111) performed update processing of software based on /data/data6, which is difference software, at 2016/5/25 12:10:00, and returned an error code 001 to the performance management module 113 to indicate that the update processing was unsuccessful. Whether or not the update processing was unsuccessful may also be determined by the terminal.

FIG. 5 shows an example of the performance data 118 to be stored by the performance management module 113 in the performance DB 114. The performance management module 113 creates the performance data 118 based on the execution record 116 and the update record 117. The performance data 118 comprises an execution record list 501 and an update record 117. The execution record list 501 is a list of execution of records of each of the plurality of modules pertaining to the data flow of the same flow ID. The performance data 118 associates the execution record 116 and the update record 117 from the terminal to which the difference software was transmitted based on the flow ID (Flow-01).

The association of the execution record 116 and the update record 117 will be explained later with reference to FIG. 7. Note that the flow ID 500 is the same as the flow ID 404 (FIG. 4) included in the update record 117 acquired from the terminal, and the performance management module 113 assigns one flow ID to one update processing performed in the terminal. Similar to the execution record 116, the execution record list 501 is configured from a module name 502, time 503, input data 504, output data 505, a processing result 506, and a flow ID 507 of each module that performed processing.

In order for the performance data 118 to correspond to one update processing in each terminal, there is one record of the terminal in the update record 117. If the difference software could not be distributed to the terminal, the update record 117 is not included in the performance data 118. The performance data 118 exists for each terminal, and for each update of the terminal.

FIG. 5 shows that the update management module Mod-0 (103) performed processing at 2016/5/25 12:00:00, processed input data /data/data1 and normally output /data/data2, the module difference software generation module Mod-1A (104) subsequently normally processed the input data /data/data2 received from the update management module Mod-0 (103) and output the /data/data3 at 2016/5/25 12:01:01, and the check sum calculation module Mod-2B (107) normally processed the /data/data3 and output the /data/data4 (difference software with check sum) at 2016/5/25 12:02:02.

FIG. 5 additionally shows that a transmission module Mod-3 (108) decided the transmission-target terminal and the path and input the /data/data4 as input data and output /data/data5 as output data at 2016/5/25 12:03:09, and a transmission module Mod-4A (109) converted the /data/data5 received at 2016/5/25 12:04:03 into the /data/data6 to be transmitted to the terminal, and sent the /data/data6 to the terminal (111).

Since the processing ended normally in each of the plurality of modules, "normal" is recorded in all processing results 506. While the flow ID from the module Mod-0 to the module Mod-3 is Flow-01, since there are branches in the flow, a branch flow ID of "Flow-01-A" is recorded in the transmission modules 109, 110 . . . . While the terminal A (111) that received the difference software /data/data6 executed update processing at 2016/5/25 12:10:00, since the update could not be performed, an error code "001" is recorded in the processing result of the execution record rather than "normal".

Figure 6:
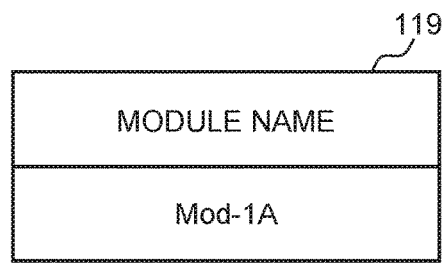
FIG. 6 shows an example of a module that is input to a performance data processing module.

FIG. 6 shows an example of the target module 120 that is input to the performance data processing module 115. FIG. 6 shows that the module name has been designated by the performance data processing module 115 in order for the screen display operation module 119 to manage, acquire and confirm the operating performance of the module. The module name may also be input to the screen display operation module 119 by the administrator. The administrator may designate, specify or select a prescribed module via the screen display operation module 119 in order to confirm the processing status, result, and performance of the module.

Figure 7:
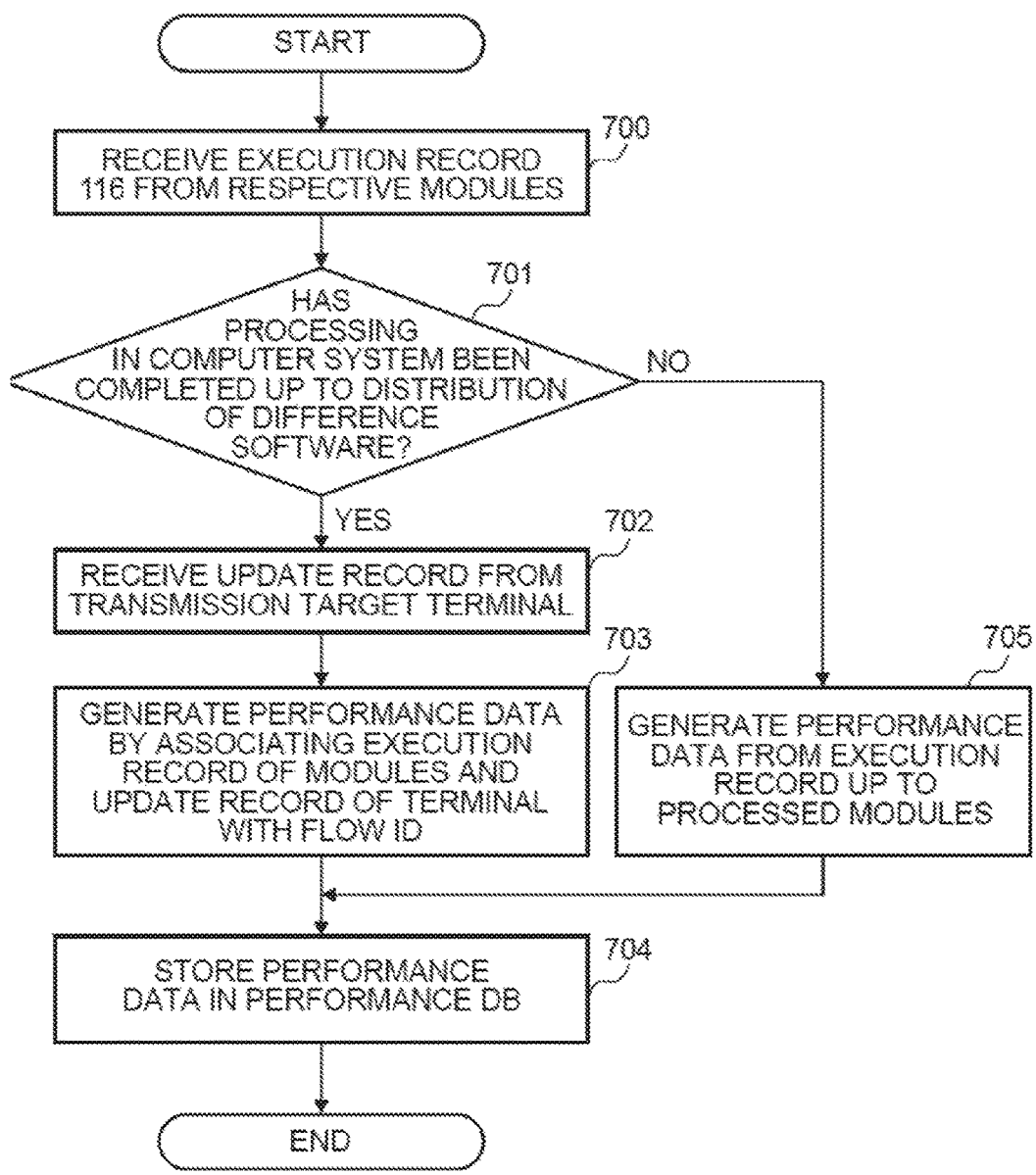
FIG. 7 is a flowchart showing an operation of the performance management module.

FIG. 7 is a flowchart showing the operation of the performance management module 113. The performance management module 113 acquires the execution result 116 of the module from each module of the computer system each time that processing is completed by the module (700). The performance management module 113 determines whether it was possible to complete the processing in the computer system and distribute the difference software to the terminal based on the execution record 116, and, upon obtaining a positive result in the foregoing determination (701: YES), receives the update record 117 from the transmission-target terminal (702), and generates the performance data 118 by associating the execution record 116 and the update record 117 of the module based on the similarity of the flow ID (305: FIG. 3) and the flow ID (404: FIG. 4) (703). The performance management module 113 stores the performance data 118 in the performance DB 114 (704).

For example, when the flow ID 404 of the update record 117 is "Flow-01-A-A", the execution record 116 having a flow ID of "Flow-01" or "Flow-01-A" is associated with the update record: "A" of "Flow-01-A-A" indicates the branch in the transmission module, and "A" of "Flow-01-A-A" indicates the branch based on the difference of the transmission-target terminals.

The branches of the data flow up to the update management module (Mod-0), the difference software generation modules (Mod-1A, 1B . . . ), and the check sum calculation modules (Mod-2A, 2B . . . ) are not differentiated by the branch numbers (-A, -B, . . . ), and are differentiated by different IDs "Flow-01, Flow-02 . . . " on grounds that the main flow of the data flow is different. The flow ID 404 of the update record 117 is assigned to the flow ID 500 (FIG. 5) of the performance data 118.

When the performance management module 113 obtains a negative result in the determination of step 701; that is, when the processing in the computer system 100 is unsuccessful midway during the data flow and the processing did not advance to the distribution of the difference software to the terminal, the performance management module 113 generates the performance data 118 from the execution record 116 up to the module to which the processing had advanced (705), and stores the performance data 118 in the performance DB 114 (704). Consequently, the performance data 118 does not include the update record 117.

In the determination of step 701, if the processing result 304 of the module included in the execution record 116 is not "normal", the performance management module 113 determines that the data flow has been interrupted in the module. The module is able to independently determine whether the processing ended normally, or unsuccessfully. Otherwise, the performance management module 113 may determine that the processing in the module was unsuccessful when the execution record 116 is not transmitted from the module within a predetermined time.

Figure 8:
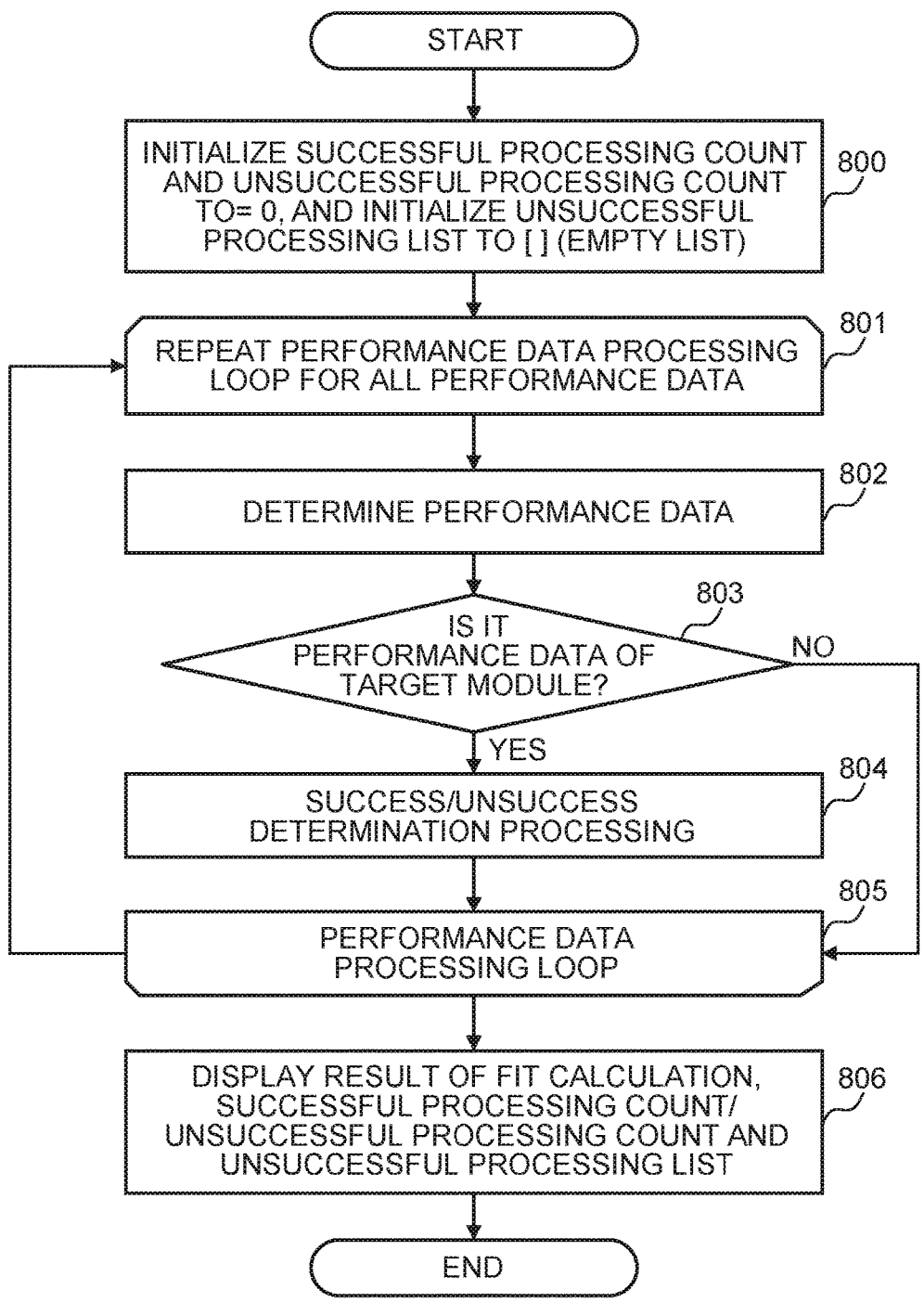
FIG. 8 is a flowchart showing an operation of the performance data processing module.

FIG. 8 is a flowchart showing the operation of the performance data processing module 115. The performance data processing module 115 calculates the information and index for evaluating and determining the performance of the module, and causes the result to be output to the screen (user interface) of the operation module 119. The performance data processing module 115 initializes the successful processing count and the unsuccessful processing count (refer to FIG. 11) as the index for evaluating the performance of the module to 0, and initializes the unsuccessful processing list to empty, respectively (800).

The performance data processing module 115 executes loop processing to all performance data 118 (FIG. 5) stored in the performance DB 114 (801-805), calculates the FIT of the module (target module) 120 input by the management user to the operation module 119, and displays the performance data during unsuccessful processing on the screen display/operation module 119 (806).

In the loop processing, the performance data processing module 115 sequentially compares the names of the target modules with each of the plurality of performance data 118 (802), and determines whether the performance data 118 includes the target module name (803). When the performance data processing module 115 obtains a positive result in the foregoing determination, the performance data processing module 115 determines whether the processing of the target module was successful or unsuccessful by referring to the processing result of the target module (506: FIG. 5) (804). When the performance data processing module 115 obtains a negative result in the determination of step 803, the performance data processing module 115 skips the determination of successful/unsuccessful (804), and repeats the processing of subsequent performance data.

Figure 11:
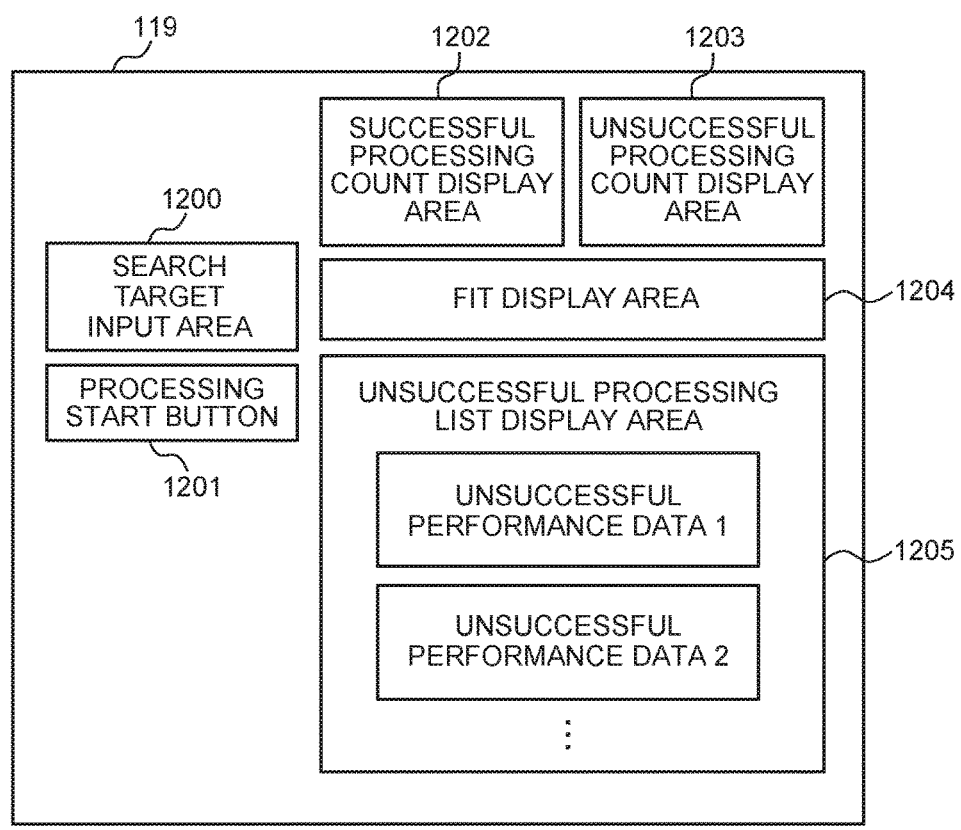
FIG. 11 shows an example (user interface) of an operation module.

After the performance data processing module 115 performs the processing of all performance data, the performance data processing module 115 calculates the FIT based on the number of target modules in which "unsuccessful" is recorded in the processing result 506, and additionally displays, collectively, the successful processing count, the unsuccessful processing count, and the unsuccessful processing list as shown in FIG. 11 described later (806). The unsuccessful processing list may also be a list of the performance data 118 including the target module in which the processing was unsuccessful.

Figure 9:
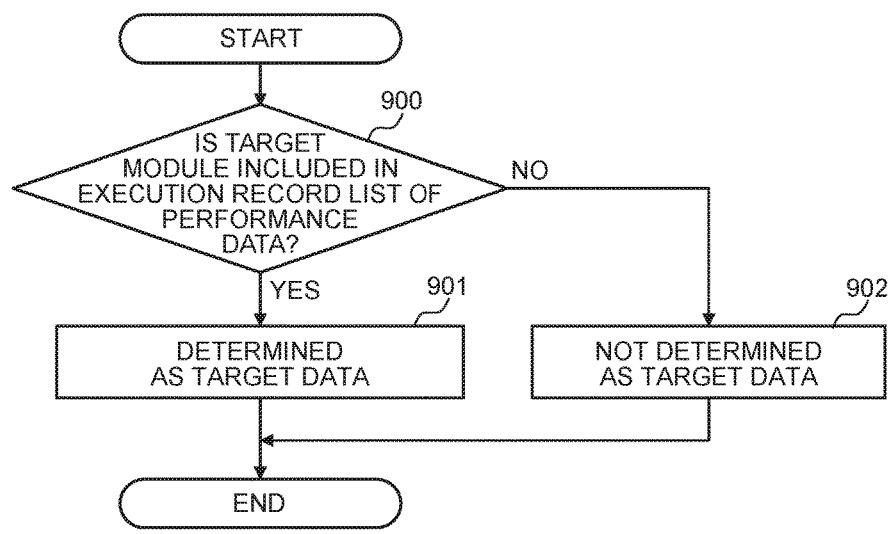
FIG. 9 is a flowchart showing the details of a part of FIG. 8.

FIG. 9 is a flowchart showing the details of the determination processing 802, 803 (FIG. 8). The computer system 100 can create the processing performance of the management user's intended module among the plurality of modules. Creating the processing performance includes calculating the FIT by calculating the unsuccessful processing count based on statistical processing.

The performance data processing module 115 checks whether the module designated by the management user is included in the performance data 118 based on the module name 502 recorded in the execution record list 501 of the performance data 118 (900). When the performance data processing module 115 obtains a positive result in the foregoing determination, the performance data processing module 115 determines that the performance data 118 is the target data for use in the operating performance processing (901), and, when the performance data processing module 115 obtains a negative result in the foregoing determination, the performance data processing module 115 determines that the performance data 118 is not the target data (902).

Figure 10:
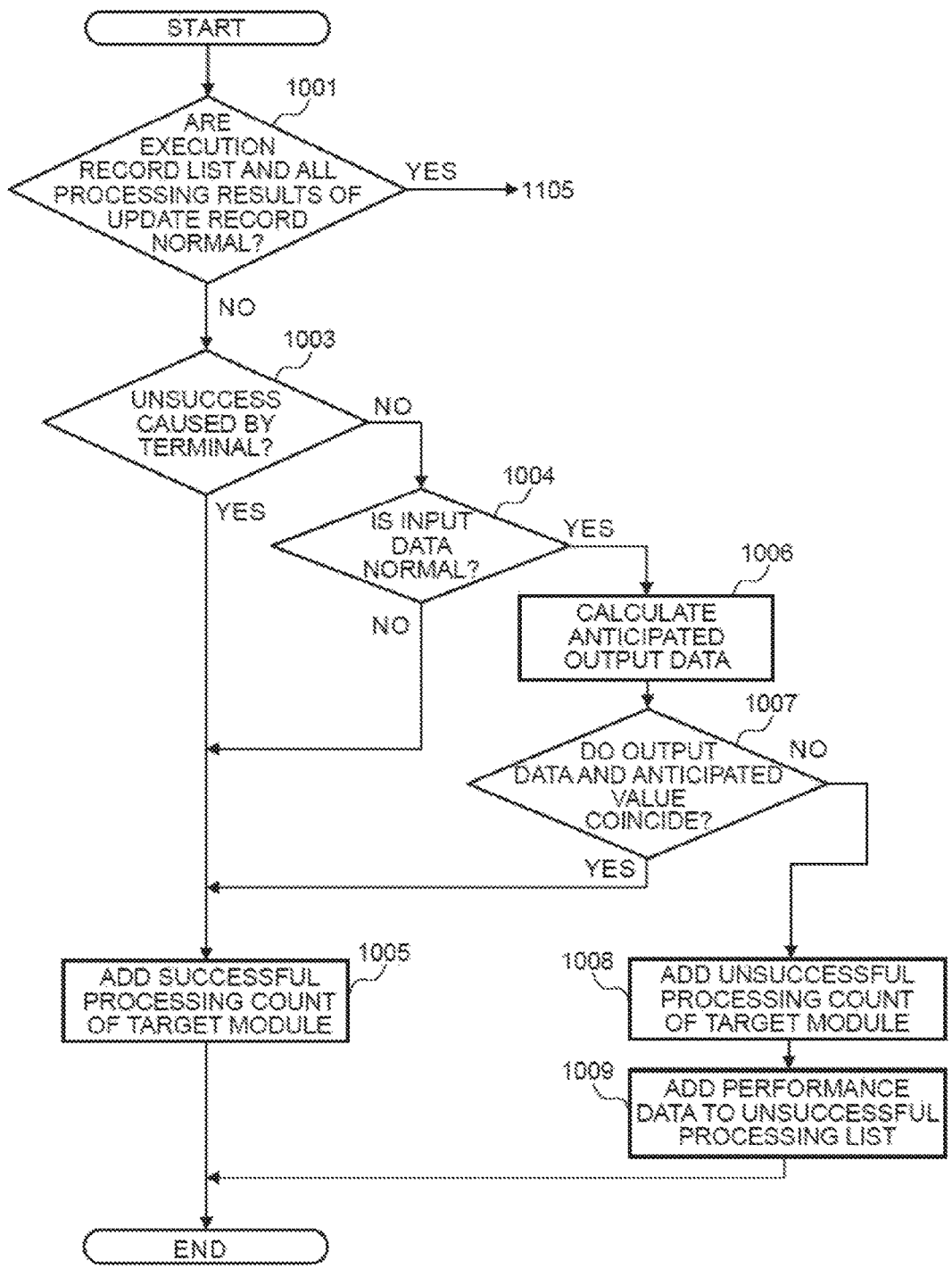
FIG. 10 is a flowchart showing the details of another part of FIG. 8.

FIG. 10 is a flowchart showing the details of the processing of the successful/unsuccessful determination processing 804 (FIG. 8). The performance data processing module 115 executes the successful/unsuccessful determination processing for generating the operating performance of the target module (FIG. 11) as described above. While the performance data processing module 115 performs the successful/unsuccessful determination processing of the target module when the module is selected by the management user, the performance data processing module 115 may also periodically determine, sequentially, all modules even when a module is not selected.

By reviewing the performance data 118, the performance data processing module 115 can determine, evaluate, identify, decide or judge whether the unsuccessful update of the software of the terminal was caused by the terminal or caused by the module of the computer system and, in the case of the latter, whether the unsuccessful update was caused by the target module.

The performance data processing module 115 checks whether "normal" is recorded in all processing results 506 of the target module and the processing results 403 of the update record 117 in the execution record list 501 of the performance data 118 (901) as the processing target (1001). When the performance data processing module 115 obtains a positive result in this step, the performance data processing module 115 determines that the processing of the target module was successful, and the processing of the terminal was also successful, adds the successful processing count of the target module (refer to FIG. 11) (1005), and then ends the processing.

When the performance data processing module 115 obtains a negative result in the determination of step 1001, the performance data processing module 115 determines whether the unsuccessful processing was caused by the terminal (1003). When the performance data processing module 115 determines that "normal" is recorded in all processing results 506 of the execution record list 501 of the performance data 118, and an error code is recorded in the processing result 403 of the update record 117, the performance data processing module 115 obtains a positive result in the determination of step 1003, and proceeds to step 1005 on grounds that the unsuccessful update of the terminal was caused by the terminal, and not caused by the processing of the target module.

When "unsuccessful" is recorded in the processing result of the target module of the execution record list 501 of the performance data 118, the performance data processing module 115 obtains a negative result in the determination of step 1003, and then proceeds to step 1004. The performance data processing module 115 confirms, in step 1004, the input data (access path to the input data) 504 to the target module included in the execution record list 501 of the performance data 118, and determines whether the input data is normal (1004). This determination may be made by comparing the input data with a prescribed standard; for instance, the input data range that is anticipated in the design specification of the target module.

When the performance data processing module 115 obtains a negative result in the determination of step 1004, the performance data processing module 115 proceeds to step 1005 on grounds that the input data is abnormal; that is, the data flow was stopped in the target module because there was an abnormality in the upstream module of the target module, and that unsuccessful processing was not caused by the target module.

When the performance data processing module 115 determines that the input data which was input to the target module is normal (1004: YES), the performance data processing module 115 calculates the anticipated output data to be output from the input data 504 in accordance with the processing of the design specification (1006). The performance data processing module 115 compares the output data 505 and the anticipated output data (1007). When the performance data processing module 115 determines that the output data 505 coincides with the anticipated output data (1007: YES), the performance data processing module 115 confirms that the processing of the target module is successful, and then proceeds to step (1005).

When the performance data processing module 115 obtains a negative result in the determination of step 1007, the performance data processing module 115 deems that the processing of the target module was unsuccessful, and, as shown in FIG. 10, adds and displays the unsuccessful processing count of the target module (1008), adds the performance data including the target module to the unsuccessful processing list display area (1009), and then ends the processing.

FIG. 11 shows an example (user interface) of the operation module 119 shown in FIG. 1. The screen operation module 119 comprises a target module input area 1200, a processing start button 1201, a successful processing count display area 1202, an unsuccessful processing count display area 1203, a FIT display area 1204, and an unsuccessful processing list display area 1205.

The performance data processing module 115 starts the processing as a result of the management user inputting the identification information (module name) of the module in the search-target input area 1200 and clicking the processing start button 1201. Subsequently, based on the sequence of the performance data processing module 115 (FIG. 8: 806), the cumulative number of successful processing of the target module is displayed in the successful processing count display area 1202, the cumulative number of unsuccessful processing is displayed in the unsuccessful processing count display area 1203, the FIT is displayed in the FIT display area 1204, and the list of target modules in which the processing was unsuccessful is displayed in the unsuccessful processing list display area 1205, respectively.

The FIT is calculated from the successful processing count (1202) and the unsuccessful processing count (1203) of the target module. The unsuccessful processing list may also be a list of the performance data in which the data flow was discontinued, halted or disappeared in the computer system due to the target module.

As explained above, according to the foregoing computer system, it is possible to identify the FIT (operating performance) of at least certain modules in the computer system. Accordingly, the administrator can use this as evidence in the application or inspection of the functional safety standard of the computer system. Furthermore, even when the processing for updating the terminal was unsuccessful, since the computer system can identify the module that caused such unsuccessful processing, this is effective in acquiring the functional safety standard as a result of being able to improve the module. Furthermore, the computer system can also select a module for which the operating performance should be checked.

The second embodiment is now explained. In the previous embodiment, as shown in FIG. 11, the computer system 100 used the performance data processing module 115 to generate the FIT and the operating performance of the target module. In the second embodiment, the computer system 100 can generate an operating performance of a data path; that is, an operating performance of a combination (path) of a plurality of modules. For example, by designating a path configured from a combination of the difference generation module B (105) and the check sum calculation module B (107), the performance data processing module 115 can generate the FIT of the target path; that is, the difference software with the difference generation module B (105), and obtain the FIT in cases where the check sum is calculated with the check sum calculation module B (107).

Furthermore, for example, there may be cases where the Mod-2B (check sum calculation module) does not generate an error upon receiving the difference software generated with the Mod-1A (difference software generation module), and generates an error upon receiving the difference software generated with the Mod-1B (difference software). This is caused by problems with the compatibility of algorithms of the two modules.

Here, when the Mod-2B is the target module as in the previous embodiment, not only the performance data 118 including the Mod-1A, but the performance data 118 including the Mod-1B will also be the target of analysis of the operating performance of the target module (Mod-2B). Since this will result in vast amounts of performance data, it becomes difficult to discover an error caused by the combination of the Mod-1B and the Mod-2B.

Meanwhile, by identifying the target path 1400 (FIG. 12) and analyzing the operating performance, the computer system 100 can limit the range of the performance data to be analyzed and, therefore, an error caused by the combination of the Mod-1B and the Mod-2B can be discovered relatively easily.

Figure 12:
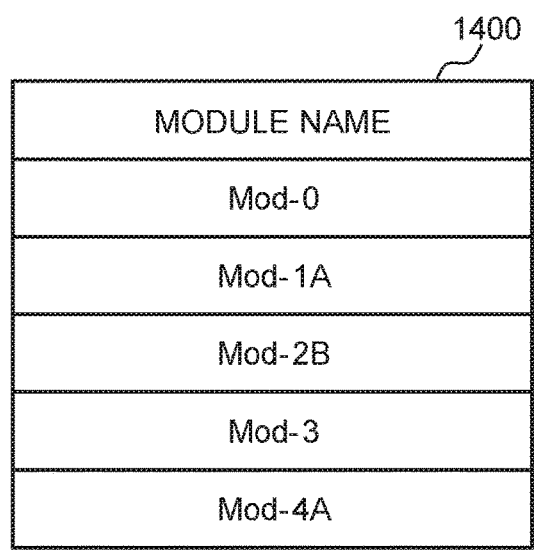
FIG. 12 shows an example of a target path.

FIG. 12 shows an example of the target path 1400. The target path 1300 is configured from a list 1200 of a plurality of module names. FIG. 12 shows that the series of flows from the generation of difference software to the transmission of difference software is configured from a path based on a combination of the module Mod-0 (update management module 103), the module Mod-1B (difference generation module B105), the module Mod-2B (check sum calculation module B107), the module Mod-3 (update-target selection module 108), and the module Mod-4A (transmission module 109).

The block diagrams (FIGS. 1 and 2) of the computer system according to the second embodiment are the same as the previous embodiment. In the second embodiment, the point that the target path can be input to the operation module 119 in substitute for the target module 120 differs from the first embodiment. In the second embodiment, the "target module" in the first embodiment is replaced by a "target path".

Figure 13:
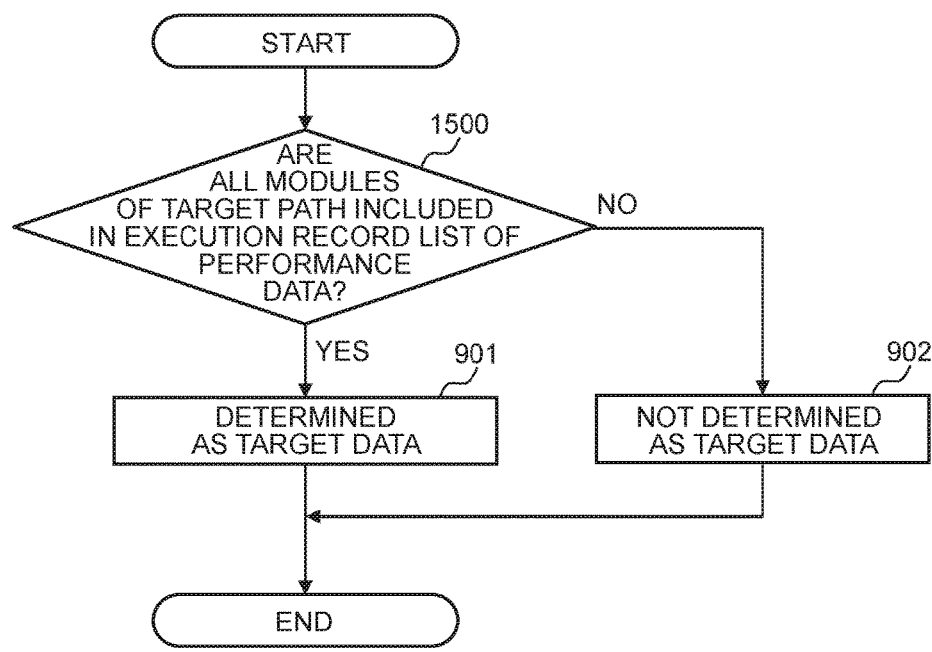
FIG. 13 is a flowchart showing the details of the target path determination processing (corresponds to 802 of FIG. 8).

FIG. 13 is a flowchart showing the details of the target path determination processing (corresponds to 802 of FIG. 8). The performance data processing module 115 checks whether the performance data 118 includes the target path 1400; that is, all modules of the target path 1400, by referring to the module name 502 of the execution record list 501 (FIG. 8) (1500). When the performance data processing module 115 obtains a positive result in the foregoing determination, the performance data processing module 115 determines that the performance data 118 is the target data (901, 902).

Figure 14:
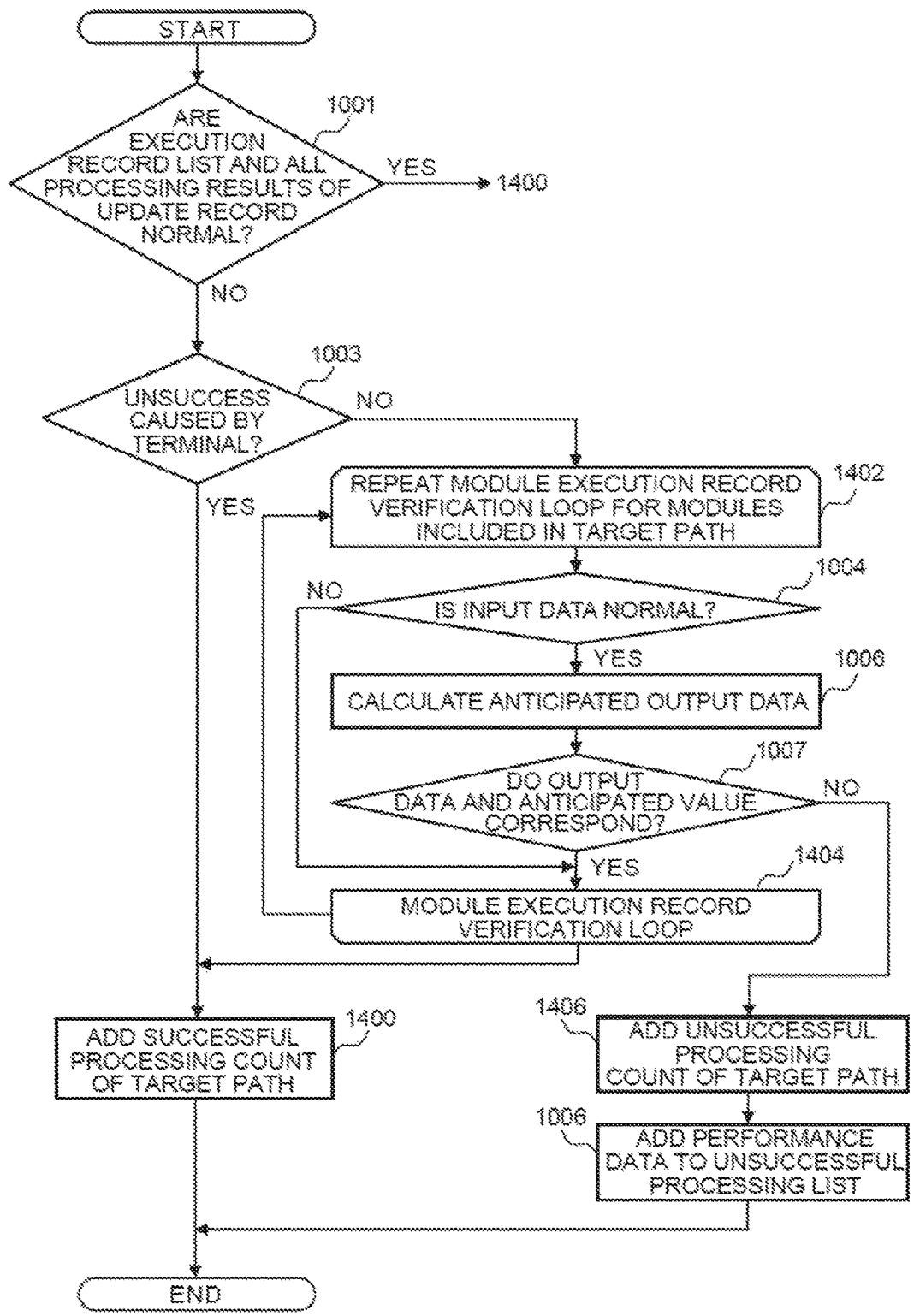
FIG. 14 is a flowchart showing the details of the successful/unsuccessful determination processing in the second embodiment.

FIG. 14 is a flowchart showing the details of the successful/unsuccessful determination processing 804 (FIG. 8) in the second embodiment. The performance data processing module 115 starts the processing when the target path is selected. By reviewing the performance data 118 as the target data, the performance data processing module 115 can determine, evaluate, identify, decide or judge whether the unsuccessful update of the terminal was caused by the terminal or caused by the target path of the computer system.

The performance data processing module 115 checks whether "normal" is registered in all processing results 506 of the plurality of modules included in the target path and the processing results 403 of the update record 117 in the execution record list 501 of the performance data 118 as the target data (1001). When the performance data processing module 115 obtains a positive result in this step, the performance data processing module 115 determines that the processing of the target path was successful, and the processing of the terminal was also successful, adds the successful processing count of the target path (refer to FIG. 11) (1400), and then ends the processing.

When the performance data processing module 115 obtains a negative result in the determination of step 1001, the performance data processing module 115 determines whether the unsuccessful processing was caused by the terminal (1003). When the performance data processing module 115 determines that "normal" is registered in all processing results 506 of the plurality of modules of the target path, and an error code is recorded in the processing result 403 of the update record 117, the performance data processing module 115 obtains a positive result in the determination of step 1003 and proceeds to step 1400 on grounds that the processing of the target path was successful even if an error code is recorded in the processing result 403 of the update record 117.

When an "error" is recorded in the processing result of the modules included in the target path, the performance data processing module 115 obtains a negative result in the determination of step 1003, and then proceeds to step 1402. The performance data processing module 115 performs the following loop processing (1402 to 1404) to all modules included in the target path 1400. In the loop processing, the performance data processing module 115 confirms the input data 504 included in the execution record list 501 of the performance data 118 and determines whether the input data was normal regarding the respective modules (1004).

If the input data which was input to the module is abnormal (1004: NO), the performance data processing module 115 proceeds to the loop processing of the next module (1404). If the input data which was input to the module is normal (1004: YES), the performance data processing module 115 calculates the anticipated output data relative to the input data (1006), and compares the anticipated output data and the output data (1007). When the output data 505 coincides with the anticipated output data (1007: YES), the performance data processing module 115 proceeds to the loop processing of the next module (1402). When the output data does not coincide with the anticipated output data (1007: NO), the performance data processing module 115 ends the loop processing and deems the processing of the target path to be unsuccessful, adds and displays the unsuccessful processing count of the target path as shown in FIG. 11 (1406), and adds the performance data including the target path to the unsuccessful processing list display area (1009).

The plurality of embodiments of the present invention explained above are all examples, and the present invention is not limited by these embodiments. The present invention is not limited by the requirements, conditions, devices, methods, components, functions, ranges, structures and configurations described in the embodiments. For example, the computer system may also be referred to as a computer center, a software transmission system, a terminal updating system, a server, or a data center. The terminal may also be referred to as a software update-target device, a target product, or a target system.

The invention claimed is:

1. A computer system which transmits software for updating a terminal, comprising:
   a plurality of modules configured to sequentially execute processing including generating updated software, representing either a new version of the software or a difference between the new version and an old version of the software, and transmitting the updated software to the terminal;
   a controller configured to collect an operation log of each of the plurality of modules, wherein the controller is configured to:
   identify a target path of the computer system,
   collect input data, output data and processing results of each of the plurality of modules as the operation logs, and
   acquire, from the terminal, update information including whether the update was successful/unsuccessful based on the software processing results of the plurality of modules included in the target path of the computer system, wherein when normal is registered in all of the processing results of the plurality of modules of the target path the update was successful, and when an error is recorded in the processing results of the plurality of modules included in the target path the update was unsuccessful, wherein the target path is configured from a list of a plurality of module names; and
   a memory configured to store the operation logs collected by the controller,
   wherein the controller is configured to generate an operating performance of a prescribed module among the plurality of modules based on the operation logs stored in the memory, and
   wherein the controller is configured to generate the operating performance by associating the operation log and the update information of each of the plurality of modules so that, if an error occurs in the update of the terminal, the controller is configured to determine whether the error was caused by at least one of the plurality of modules or whether the error was caused by the terminal.

2. The computer system according to claim 1, wherein the controller is configured to generate the operating performance of a module selected by an administrator among the plurality of modules based on the operation logs stored in the memory.

3. The computer system according to claim 1, wherein the controller is configured to store in the memory, as a list, the operation logs of each of the plurality of modules which sequentially executed the processing.

4. The computer system according to claim 1, wherein the controller is configured to:
determine a module which was unsuccessful in performing processing based on the operation logs of each of the plurality of modules which sequentially executed the processing; and
report the module.

5. The computer system according to claim 1, wherein the controller is configured to generate the operating performance of a combination of modules selected by an administrator among the plurality of modules based on the operation logs stored in the memory.

6. The computer system according to claim 1, wherein the controller is configured to:
determine a combination of modules which was unsuccessful in performing processing based on the operation logs of each of the plurality of modules which sequentially executed the processing; and
report the combination of modules.

7. The computer system according to claim 1, wherein the controller is configured to generate a failure rate, as the operating performance, based on a number of successful processing and a number of unsuccessful processing with regard to a prescribed module among the plurality of modules from the operation logs stored in the memory.

8. A method of managing transmission of software for a computer system to manage transmission of software for updating a terminal,
wherein a plurality of modules of the computer system sequentially execute processing including generating updated software, representing either a new version of the software or a difference between the new version and an old version of the software, and transmitting the updated software to the terminal,
wherein a controller of the computer system:
identifies a target path of the computer system,
collects an operation log of each of the plurality of modules;
collects input data, output data and a processing results of each of the plurality of modules as the operation logs, and
acquires, from the terminal, update information including whether the update was successful/unsuccessful based on the software processing results of the plurality of modules included in the target path of the computer system, wherein when normal is registered in all of the processing results of the plurality of modules of the target path the update was successful, and when an error is recorded in the processing results of the plurality of modules included in the target path the update was unsuccessful, wherein the target path is configured from a list of a plurality of module names;
stores the collected operation logs in a memory; and
generates an operating performance of a prescribed module among the plurality of modules based on the operation logs stored in the memory;
wherein the controller generates the operating performance by associating the operation log and the update information of each the plurality of modules so that, if an error occurs in the update of the terminal, it is determined whether the error was caused by at least one of the plurality of modules or whether the error was caused by the terminal.

9. A method for causing a computer system to manage transmission of software for updating a terminal, the method comprising:
causing a plurality of modules of the computer system to sequentially execute processing including generating updated software, representing either a new version of the software or a difference between the new version and an old version of the software, and transmitting the updated software to the terminal;
identifying a target path of the computer system,
collecting an operation log of each of the plurality of modules;
collecting input data, output data, and processing results of each of the plurality of modules as the operation logs, and
acquiring, from the terminal, update information including whether the update was successful/unsuccessful based on the software processing results of the plurality of modules included in the target path of the computer system, wherein when normal is registered in all of the processing results of the plurality of modules of the target path the update was successful, and when an error is recorded in the processing results of the plurality of modules included in the target path the update was unsuccessful, wherein the target path is configured from a list of a plurality of module names;
storing the collected operation logs in a memory;
generating an operating performance of a prescribed module among the plurality of modules based on the operation logs stored in the memory; and
generating the operating performance by associating the operation log and the update information of each of the plurality of modules so that, if an error occurs in the update of the terminal, it is determined whether the error was caused by at least one of the plurality of modules or whether the error was caused by the terminal.

10. A non-transitory computer-readable recording medium storing a program for executing the method according to claim 9.

* * * * *